United States Patent [19]

McLauchlan

[11] 3,773,373

[45] Nov. 20, 1973

[54] MEANS FOR MOUNTING BUMPERS ON RECTILINEAR ENERGY ABSORBERS

[75] Inventor: John McLauchlan, Royal Oak, Mich.

[73] Assignee: Houdaille Industries, Inc., Buffalo, N.Y.

[22] Filed: Sept. 15, 1971

[21] Appl. No.: 180,740

[52] U.S. Cl. .................................. 293/99, 248/204
[51] Int. Cl. ............................................. B60r 19/02
[58] Field of Search ................. 248/15, 204, 358 R; 267/133; 293/1, DIG. 2, DIG. 5, 64, 65, 66, 67, 70, 84, 85, 86, 87, 99, 100, 101

[56] References Cited
UNITED STATES PATENTS

| 2,845,144 | 7/1958 | Bohn | 188/1 C |
| 2,227,560 | 1/1941 | Szabo | 293/86 |
| 2,610,881 | 9/1952 | Schuettpelz | 293/70 |
| 2,917,264 | 12/1959 | Hartenstein | 248/358 R |
| 1,516,916 | 11/1924 | Dougherty | 188/8 |
| 2,244,353 | 6/1941 | Zaiger | 293/66 |

Primary Examiner—Gerald M. Forlenza
Assistant Examiner—Robert Saifer
Attorney—Carlton Hill et al.

[57] ABSTRACT

Bumper mounting brackets provide for rectilinear transmission of thrust from the bumper to a rectilinear energy absorber, and enable relative angular, rocking freedom of movement to minimize lateral or bending strains on the absorber. The brackets have rectilinear rigidity and impact resistance, coupled with resilient yieldability for accommodating relative angular impact displacements of the bumper with respect to the absorber.

14 Claims, 7 Drawing Figures

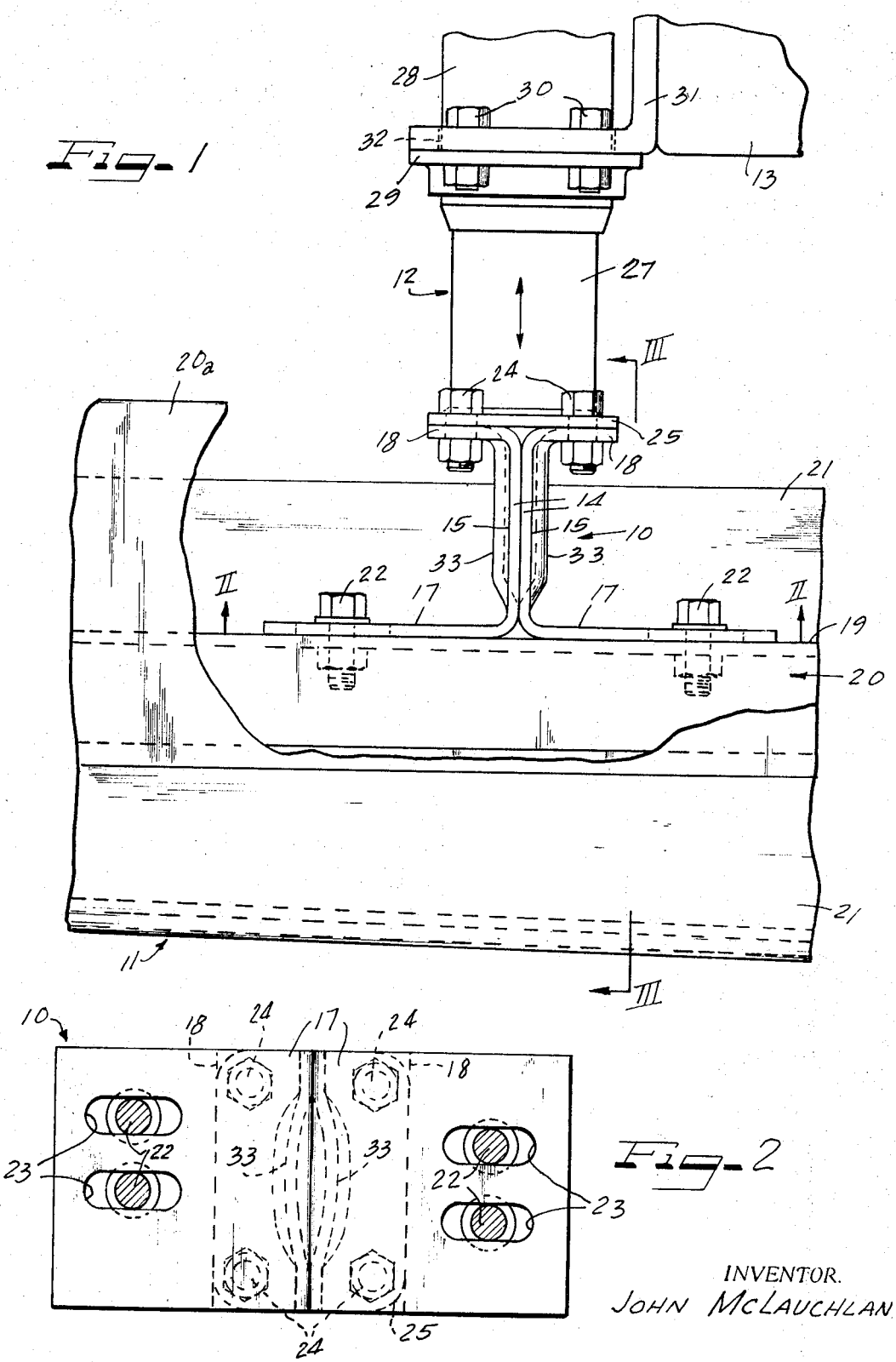

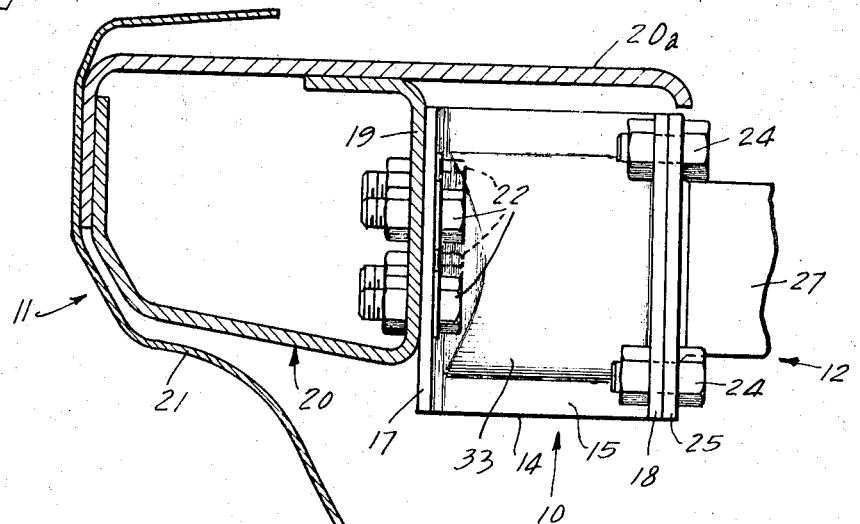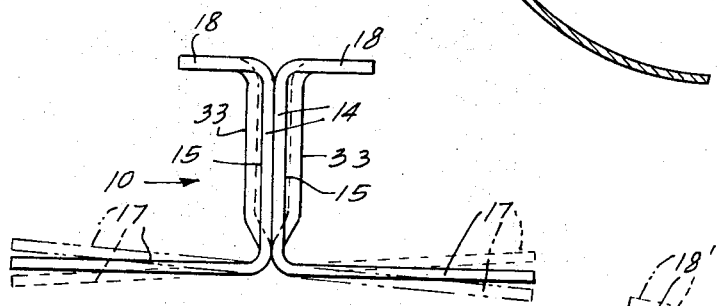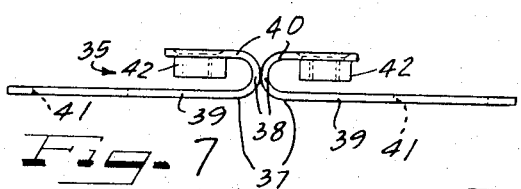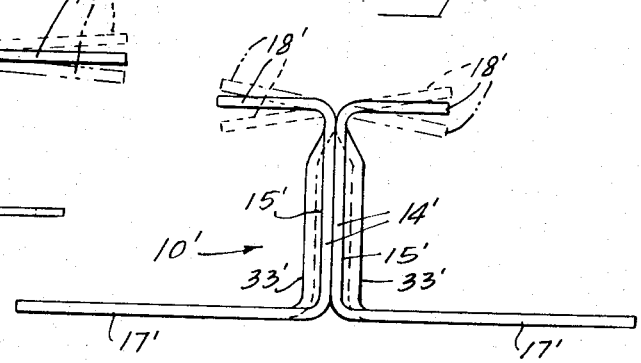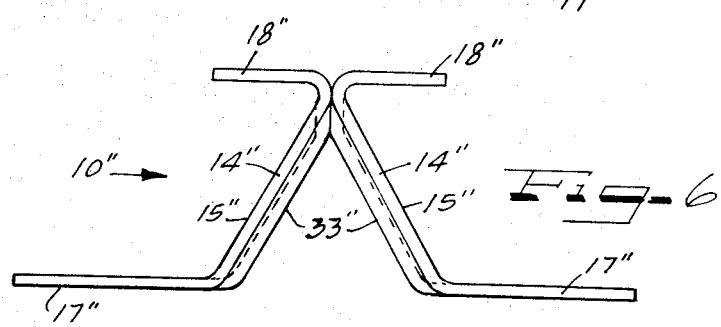

MEANS FOR MOUNTING BUMPERS ON RECTILINEAR ENERGY ABSORBERS

This invention relates in general to energy absorbing bumper support systems, and is more particularly concerned with the mounting of automobile bumpers in a manner to protect them and the associated carrying vehicle or impacted objects against damage from at least minor collisions and energy thrusts which may be encountered in service.

In order to minimize the damage potential resulting from at least minor collisions involving automotive vehicle bumpers, in particular, such as may occur at as low as 3 m.p.h. to about 10 m.p.h. impact of one vehicle relative to another, where the bumpers are mounted in an essentially fixed or rigid manner relative to the vehicle frame, it has been proposed to mount these bumpers on or in association with rectilinear energy absorbers enabling yielding of the bumpers towards the vehicle frame in a manner to prevent or at least substantially alleviate damage. Such absorbers may be of the so-called direct acting or telescopic type on the order of shock absorbers commonly employed in vehicle suspensions and having not only telescopic energy absorbing capability, but also return or recovery capability such that after a collapsing, telescoping stroke, the absorber will automatically return to normal extended condition.

A disadvantage heretofore encountered in employment of telescopic absorbers in bumper mountings has resided in necessarily extreme resistance to bending or lateral distortion of such absorbers throughout their length, whereas impact against bumpers is rarely encountered in a manner which will assure straight-in displacement of the bumper free from any canting. This results from the fact that the bumpers have a considerable horizontal length against any portion of which the impact may be focused or concentrated such that there is a greater tendency to yield inwardly of the impacted portion of the bumper where the point of impact is other than dead center, i.e., directly aligned with the axis of the vehicle. To alleviate this problem, it has been proposed to provide pivotal connections between the bumper and absorber or at least one end of the absorber and either the bumper or the frame, or at both ends, and associate the absorber with primary support for the bumper rather than to have the absorber itself support the bumper. Prior expedients have, however, been deficient in several respects, among which have been excessive liability to looseness and rattling, high and sometimes intolerable costs, particularly for moderate and low-priced vehicles, and other deficiencies and shortcomings.

An important object of the present invention is to overcome the foregoing and other disadvantages, defects, inefficiencies, shortcomings and problems and to provide new and improved means for mounting bumpers on rectilinear energy absorbers.

Another object of the invention is to provide a new and improved bumper mounting bracket structure for efficient utilization of rectilinear energy absorbers in bumper support systems.

A further object of the invention is to provide new and improved low-cost, efficient, durable, reliable means for mounting bumpers in association with rectilinear energy absorbers and enabling not only rectilinear but also canted displacement of the bumper relative to the associate supporting structure, without binding or stressing the absorber.

Yet another object of the invention is to provide a new and improved bumper mounting bracket structure having rectilinear rigidity as well as resilient flexibility capability adapting the same especially for use in mounting automotive vehicle bumpers on and in association with supporting rectilinear energy absorbers.

Other objects, features and advantages of the invention will be readily apparent from the following description of certain preferred embodiments thereof, taken in conjunction with the accompanying drawings, although variations and modifications may be effeced without departing from the spirit and scope of the novel concepts embodied in the disclosure, and in which:

FIG. 1 is a fragmentary top plan view showing an assembly embodying features of the invention;

FIG. 2 is a sectional elevational view taken substantially along the line II—II of FIG. 1;

FIG. 3 is a vertical sectional detail view taken substantially along the line III—III of FIG. 1;

FIG. 4 is a plan view of the bracket structure of FIGS. 1-3 illustrating, schematically, certain functional characteristics;

FIG. 5 is a plan view of a modification of the bracket structure;

FIG. 6 is a plan view of another modification of the bracket structure; and

FIG. 7 is a plan view of a further modification.

On reference to FIGS. 1-4, a bracket structure 10 according to the present invention is constructed and arranged to connect a bumper assembly 11 to a rectilinear energy absorber 12 mounted on a support such as an automotive vehicle frame 13. Construction of the bracket structure 10 is such that together with the absorber 12, the bumper assembly 11 is adapted to be fully supported at one side of an associated vehicle frame 13, and a duplicate or alochiral bracket structure and absorber are adapted to provide the full support for the bumper at the opposite side of the vehicle frame 13 at the front or the rear of the vehicle or at both places. Thereby, two of the bracket structures 10 and two of the absorbers 12 will serve to support the bumper assembly 11 at proper elevation and against upward or downward or transverse displacement relative to the vehicle frame 13, but the absorber 12 will permit inward displacement of the bumper toward the frame 13 in response to pressures or impacts of a magnitude which might otherwise damage the bumper or the vehicle or both.

Construction and arrangement of the bracket structure 10 is such that it has great vertical stability to withstand jacking forces when the bumper is engaged by a lifting jack to elevate the associated vehicle. In addition, the bracket structure is possessed of great linear rigidity for impact force transmission from the bumper assembly to the absorber, and ample torsional resilient flexibility for canting displacements of the bumper relative to the vehicle frame or to avoid binding of the absorber or shock isolator during shock or other impact induced inward displacements of the bumper. To this end, the bracket structure is preferably constructed as a pair of identical bracket members 14 which cooperate in mounted assembly back-to-back. Each of the members 14 is desirably constructed of resilient metal suitable for the intended bumper system. For example, 0.090 to 0.180 inch thick, heat-treated steel which will strongly resist compressive forces, but is possessed of adequate resilience for the intended purpose, may be used, such as SAE 1074, heat-treated to .401–.461 Brinell. Where practicable merely work-hardened material or material which is inherently possessed of the desired characteristics may be used. Desirably the material should lend itself readily to simple stamping and forming process of manufacture. If preferred, a one-piece section extruded or forged bracket structure may be employed possessing the desirable attributes of the invention.

Each of the bracket members 14 may be constructed from a rectangular piece of the material shaped to provide a straight body portion 15 having at outboard end a right angularly extending flange 17 for attachment to the bumper 11, and at its inboard end a right angular flange 18 extending in the same direction as the flange 17 and parallel thereto and adapted for attachment to the absorber 12. For a typical front bumper system, the bracket members 14 may be about 4 inches wide, with the overall body length to the respective outer faces of the attachment flanges about ¾ to 3¼ inches, the bumper attachment flange about 4 inches in length and the absorber attachment flange about 1½ inches in length.

In mounting the bracket 10, the bracket bodies 15 are placed in coextensive back-to-back abutment with the flanges 17 extending in a common vertical plane in opposite horizontal directions and abutting a vertical inwardly facing flange 19 of a horizontally extending box-beam 20 reinforcing and carrying a bumper shell 21 of the bumper assembly 11. Attachment of the bracket flanges 17 is desirably effected by means of rivets or bolts 22 extending through longitudinally elongated bolt holes 23 in the flanges enabling optimum horizontal adjustment of the bolts relative to the beam flange 19 in which the bolt holes are preformed and dimensioned in complementary diameter to the bolt shanks. An upper flange 20a of the reinforcing box-beam may extend inwardly in overlying protective relation to the bracket 14.

Attachment of the bracket flanges 18 to the absorber 12 is effected by means of bolts 24 securing the bracket flanges to an outer end lateral attachment flange 25 on a reciprocable plunger 27 of the absorber which normally projects in protracted relation from a barrel 28 of the absorber which carries on its front end portion a mounting flange 29 secured as by means of bolts 30 to a supporting L-shaped bracket flange 31 attached in any suitable manner fixedly to the associated beam or bar of the frame 13. To accommodate the barrel 28, the supporting bracket flange 31 has a clearance aperture 32 therethrough, with the mounting flange 29 resting against the outer face of the supporting bracket flange. Through this arrangement, inward displacement of the bumper 11 effects inward stroking of the absorber plunger 27, with the barrel flange 29 and the bracket 31 holding the absorber barrel in fixed relation to the frame 13.

In order to improve the rigidity of the bracket bodies 15 and reinforce the same against impact distortion, each of the bracket bodies may be formed with a longitudinal rib 33 of substantial radius projecting in the same direction as the flanges 17 and 18 and extending into reinforcing relation to the juncture between one of the flanges and the body. In the form of FIGS. 1–4, the reinforcing rib extends across the juncture between the bracket body 15 and the absorber attachment flange 18 such that this juncture is quite rigid and there is strong resistance to any hinging at such juncture. On the contrary, at the opposite end of the bracket body 15 in each instance, the juncture with the attachment flange enables resilient hinging movement of the flange relative to the body. Thus, where the reinforcing rib 33 maintains the juncture with the flange 18 rigid, the reinforcing rib terminates short of the juncture with the attachment flange 17 so that resilient hinging of the flange 17 relative to the body 15 is enabled. This feature is demonstrated in FIG. 4 where it will be observed that the attachment flanges 17 of the bracket 10 are hingedly swingable in concert as indicated in dash outline and in dot-dash outline so as to accommodate canting of the bumper 11 relative to the absorber 12 which, of course, is held on a fixed axis through its mounting to the frame. Thereby, when the bumper is impacted to either side of the longitudinal axis plane of the vehicle on which the bumper is mounted, so that the bumper 11 cants as it is displaced inwardly, the inward component force is efficiently transmitted by the bracket 10 straight onto the absorber 12, while the flanges 17 rock or hinge to accommodate the canted position of the bumper, which will vary as bumper displacement continues. On return of the bumper to original position, the flanges 17 due to their resilience readily return to their original position, and assist in returning the bumper to the desired transverse normal position relative to the associated vehicle.

Referring to FIG. 5, alternatively to having the mounting bracket flanges which are attached to the bumper assembly resiliently hingedly flexible, the bracket flanges which are attached to the absorber may be resiliently hingedly flexible where that is deemed preferable or more feasible. Where that arrangement is desired, the reinforcing rib 33′ on the body 15′ of each of the bracket members 14′ extends across the juncture between the body and the bumper attachment flange 17′ while the rib terminates short of the juncture between the bracket body 15′ and the absorber attachment flange 18′. Thus, the flanges 18′ of the bracket assembly 10′ will be resiliently hingedly flexible about the joints as schematically indicated in FIG. 5.

Where the particular installation is deemed to require increased angular impact resistance as well as excellent head-on impact resistance, the modification of FIG. 6 may be employed. Therein, the bracket assembly 10″ has, similarly as in the other forms, a pair of bracket members 14″ set back-to-back, but with the body portions 15″ divergently related from abutment at their inner or absorber attachment ends, or stated alternatively, extending obliquely from the bumper attachment flanges 17″ to abutment shoulders adjacent to the absorber attachment flanges 18″. In this instance the reinforcing ribs 33″ are at the confronting sides of the body portions 15″ running to and reinforcing the junctures with the flanges 17″, but extending short of the junctures with the flanges 18″ and in shouldering abutment at their ends adjacent to the flanges 18″. It will be understood that the flanges 18″ will have the same canting ability as the flanges 18′ in FIG. 5 by virtue of the resilient hinging flexibility of the junctures between the body portions 15″ and the flanges 18″.

In FIG. 7 is shown a form of the invention which is especially suitable for use where the available space between the outboard end of the absorber and the bumper is extremely limited such as from about ¾ inches to 1½ inches. To this end, a bracket structure 35 comprises similar bracket members 37 which may be formed heavy gauge sheet metal members having their planes disposed vertically in assembly between a bumper and an absorber and each provided with a body 38 formed on a radius and joining with respective outboard bumper attachment flanges 39 and respective inboard absorber-attachment flanges 40. In this instance the outboard flanges 39 are of substantially greater length than the inboard flanges 40 and have horizontally elongated respective attachment bolt slots 41. Means are provided on the shorter inboard flanges 40 for bolt-on attachment to the absorber, desirably comprising so-called clinch nuts 42 permanently affixed to the outboard sides of these flanges which are suitably apertured for the purpose. By having the bracket member backs 38 arched toward one another in engagement, extremely rigid mutual support is provided against deformation by inboard impact forces which are thus efficiently transmitted from the bumper through the bracket structure to the absorber. On the other hand at least the outboard flanges 39 are enabled to respond resiliently flexibly to relative canting of the bumper with respect to the absorber.

As will be observed, in all forms of the bracket means for mounting th bumper on rectilinear energy absorbers, the bracket body and flanges have great resistance to deformation in their planes, and by orienting those planes in a vertical direction in an automobile bumper, jacking forces or other forces tending to effect roll are thoroughly resisted. Nevertheless, canting of the bumper about a vertical axis during inward displacement due to impact is efficiently accommodated by the hinging capability of at least certain of the attachment flanges of the bracket structure. Thereby not only is impact force efficiently transmitted from the bumper by the bracket structure to the energy absorber, but the energy absorber is relieved from undue transverse or bending stresses during energy absorbing stroking thereof.

It will be understood that variations and modifications may be effected without departing from the spirit and scope of the novel concepts of this invention.

I claim as my invention:

1. In a mounting for a bumper on a rectilinear energy absorber:
    a force transmission bracket structure connected to and between the bumper and the energy abosrber and comprising a body rigidly resistive to impact forces and respective flanges angular to the body and having means for attachment to the bumper and to the energy absorber;
    at least one of said flanges being resiliently hingedly flexibly connected to the body to enable canting of the bumper while under impact displacement toward the energy absorber;
    said bracket structure comprising a pair of heavy gauge sheet metal members each having a body portion and respective bumper and energy asborber attachement flanges;
    said body portions being in back-to-back engagement and with said flanges of the respective members extending in respectively opposite directions; and
    said body portions having longitudinally extending reinforcing ribs.

2. In a mounting according to claim 1, said reinforcing ribs extending through junctures with certain of the flanges and extending short of others of the flanges.

3. In a mounting according to claim 2, said body portions extending in straight back-to-back relation throughout their lengths and said ribs projecting away from the backs of the body portions.

4. In a mounting according to claim 2, said body portions being divergently related, and said ribs projecting from the backs of the body portions and joining in shouldering relation at one of their ends.

5. In a mounting for a bumper on a rectilinear energy absorber:
    a force transmission bracket structure connected to and between the bumper and the energy absorber and comprising a body rigidly resistive to impact forces and respective flanges angular to the body and having means for attachment to the bumper and to the enerby absorber;
    said bracket structure comprising a pair of formed heavy gauge metal members each of which has a body portion with the body protions adapted to be placed in back-to-back relation and said attachment flanges being at the respective opposite ends of said body portions and extending away from the backs of the body portions; and
    each of said body portions having a respective longitudinally extending reinforcing rib which runs through and reinforces the juncture of the body portion with one of said flanges and extends short of the other of said flanges, whereby the juncture with said other of said flanges serves as a resilient hinge enabling hinging flexure of said other of said flange relative to the body portion.

6. In combination with a horizontal bumper having an inboard side and generally rectilinear absorber means supported in outboard projecting relation on a supporting structure and having a limited range of stroking movement relative thereto:
    connecting bracket structure comprising rigid body means extending to and between said inboard side of the bumper and said absorber means;
    attachment flange means on both ends of said body means attached to respectively the bumper and said absorber means;
    the flange means at least at one end of the body means being resiliently hingedly flexible relative to the body means to accommodate canting of the bumper relative to the absorber means while displacing inwardly on impact which drives the bumper inboard toward the absorber means;
    said bracket structure comprising members having body portions comprising said body means and said body portions and said flange means being of substantial width and oriented with their planes vertical;
    said body portions having longitudinally extending reinforcing ribs which run in reinforcing relation through the junctures with the body portions of the flange means located on the opposite ends of the body portions of each of the members, and said ribs extending short of the flange means at said one end of the body portions whereby the junctures of said one end flange means with the body portions permit resilient hinging flexing of said one end flange means relative to the rigid body portions.

7. In a mounting for a bumper on a rectilinear energy absorber:
  a force transmission bracket structure connected to and between the bumper and the energy absorber and comprising a body rigidly resistive to impact forces and respective flanges angular to the body and having means for attachment to the bumper and to the energy absorber;
  at least one of said flanges being resiliently hingedly flexibly connected to the body to enable canting of the bumper while under impact displacement toward the energy absorber;
  said bracket structure comprising a pair of heavy gauge sheet metal members each having a body portion and respective bumper and energy absorber attachment flanges;
  said body portions being in back-to-back engagement and with said flanges of the respective members extending in respectively opposite directions; and
  rib means stiffly reinforcing said body portions.

8. In a mounting according to claim 7, said reinforcing means comprising ribs formed on said body portions and projecting away from the backs of the body portions.

9. In a mounting according to claim 7, said reinforcing means extending to and including the remaining of said flanges to thereby reinforce the juncture between said remaining of the flanges and the body substantially rigidly against flexing.

10. In a mounting according to claim 9, said reinforcing means comprising ribs on said body portions projecting away from the backs of the body portions.

11. In a combination with a horizontal bumper having an inboard side and generally rectilinear absorber means supported in outboard projecting relation on a supporting structure and having a limited range of stroking movement relative thereto:
  connecting bracket structure comprising rigid body means extending to and between said inboard side of the bumper and said absorber means;
  attachment flange means on both ends of said body means attached to respectively the bumper and said absorber means;
  the flange means at least at one end of the body means being resiliently hingedly flexible relative to the body means to accommodate canting of the bumper relative to the absorber means while displacing inwardly on impact which drives the bumper inboard toward the absorber means;
  said bracket structure comprising members having body portions comprising said body means and said body portions and said flange means being of substantial width and oriented with their planes vertical; and
  longitudinally extending reinforcing rib means on said body portions.

12. In a combination according to claim 11, said reinforcing rib means extending short of the flange means at said one end of the body portions and running in reinforcing relation through the junctures with the body portions of the flange means located on the opposite ends of the body portions of each of the members whereby substantially to stiffen against flexing.

13. In a combination according to claim 12, said reinforcing means comprising central longitudinally extending ribs formed on said body portions and across said junctures with the flanges at said opposite ends of the body portions.

14. In a combination according to claim 11, said reinforcing means comprising central longitudinally extending ribs formed on said body portions.

* * * * *